(12) United States Patent
Ho

(10) Patent No.: US 6,252,988 B1
(45) Date of Patent: *Jun. 26, 2001

(54) METHOD AND APPARATUS FOR CHARACTER RECOGNITION USING STOP WORDS

(75) Inventor: Tin Kam Ho, Cedar Grove, NJ (US)

(73) Assignee: Lucent Technologies Inc., Murray Hill, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/112,549

(22) Filed: Jul. 9, 1998

(51) Int. Cl.[7] .............................. G06K 9/72; G06K 9/68; G06K 9/62; G06F 15/00

(52) U.S. Cl. .......................... 382/229; 382/226; 382/161; 707/500

(58) Field of Search .................................. 382/159, 160, 382/161, 229, 224, 226, 227, 228; 707/500

(56) References Cited

U.S. PATENT DOCUMENTS

| | | | |
|---|---|---|---|
| 4,975,975 | * 12/1990 | Filipski | 382/227 |
| 5,375,176 | * 12/1994 | Spitz | 382/228 |
| 5,513,304 | * 4/1996 | Spitz et al. | 707/500 |
| 5,638,543 | * 6/1997 | Pederson et al. | 704/1 |
| 5,825,925 | * 10/1998 | Baird et al. | 382/225 |
| 5,862,259 | * 1/1999 | Bokser et al. | 382/228 |
| 5,909,510 | * 6/1999 | Nakayama et al. | 382/229 |

OTHER PUBLICATIONS

Lebourgeois et al, "An Evolutive OCR System Based on Continuous Learning"; IEEE Proceedings on Application of Computer Vision, ISBN: 0-8186-7620-5; pp. 272-277, Dec. 1996.*

G. Nagy, "At the Frontiers of OCR"; IEEE Proceedings, ISSN: 0018-9219; vol. 80, Issue 7, pp. 1093-1100, Jul. 1992.*

George W. Hart, "To Decode Short Cryptograms"; Communications of the ACM, vol. 37, No. 9, pp. 102-107, Sep. 1994.*

G. Nagy, Y. Xu, "Automatic Prototype Extraction For Adaptive OCR," Proceedings of the Fourth International Conference on Document Analysis and Recognition, Ulm, Germany, Aug. 18-20, 1997, pp. 278-282.

A. L. Spitz, "An OCR Based On Character Shape Codes and Lexical Information," Proceedings of the 3rd International Conference on Document Analysis and Recognition, Montreal, Canada, Aug. 14-18, 1995, pp. 723-728.

G. Nagy, Y. Xu, "Priming the Recognizer," Proceedings of the IARP Workshop on Document Analysis Systems, Malvern, PA, Oct. 14-16, 1996, pp. 263-281.

(List continued on next page.)

Primary Examiner—Amelia M. Au
Assistant Examiner—Mehrdad Dastouri
(74) Attorney, Agent, or Firm—Donald P. Dinella

(57) ABSTRACT

An adaptive OCR technique for character classification and recognition without the input and use of ground truth derived from the image itself. A set of so-called stop words are employed for classifying symbols, e.g., characters, from any image. The stop words are identified independent of any particular image and are used for classification purposes across any set of images of the same language, e.g., English. Advantageously, an adaptive OCR method is realized without the requirement of the selection and inputting of ground truth from each individual image to be recognized.

9 Claims, 3 Drawing Sheets

OTHER PUBLICATIONS

T. Hong, "Integration Of Visual Inter–Word Constraints and Linguistic Knowledge In Degraded Text Recognition," Proceedings of 32nd Annual Meeting of Association for Computational Linguistics, student session, Las Cruces, New Mexico, Jun. 1994, pp. 328–330.

T. Hong, J. J. Hull, "Improving OCR Performance With Word Image Equivalence," Fourth Annual Symposium on Document Analysis and Information Retrieval (DAIR95), Las Vegas, Nevada, Apr. 1995, pp. 1–21.

G. Nagy, Y. Xu, "Bayesian Subsequence Matching And Segmentation," *Elsevier Science,* Nov. 4, 1997, pp. 1–8.

G. E. Kopec, M. Lomelin, "Document–Specific Character Template Estimation," Proceedings of SPIE, vol. 2660, San Jose, California, 1996, pp. 14–26.

F.R. Chen et al., "Extraction of Thematically Relevant Text," *Proc. of the 5th Ann. Symp. on Document Analysis and Information Retrieval,* Las Vegas, Apr. 1996, pp. 163–178.

* cited by examiner

FIG. 1

STOP WORD SET
100

| | | | | | |
|---|---|---|---|---|---|
| a | did | it | not | than | were |
| about | do | its | now | that | what |
| after | down | just | of | the | when |
| all | each | know | old | their | where |
| also | even | life | on | them | which |
| an | first | like | one | then | who |
| and | for | little | only | there | will |
| any | from | long | or | these | with |
| are | get | made | other | they | work |
| as | good | make | our | this | world |
| at | had | man | out | those | would |
| back | has | many | over | three | year |
| be | have | may | own | through | years |
| because | he | me | people | time | you |
| been | her | men | said | to | your |
| before | here | more | same | too | |
| being | him | most | see | two | |
| between | his | Mr. | she | under | |
| both | how | much | should | up | |
| but | I | must | so | very | |
| by | if | my | some | was | |
| can | in | never | state | way | |
| could | into | new | still | we | |
| day | is | no | such | well | |

FIG. 2

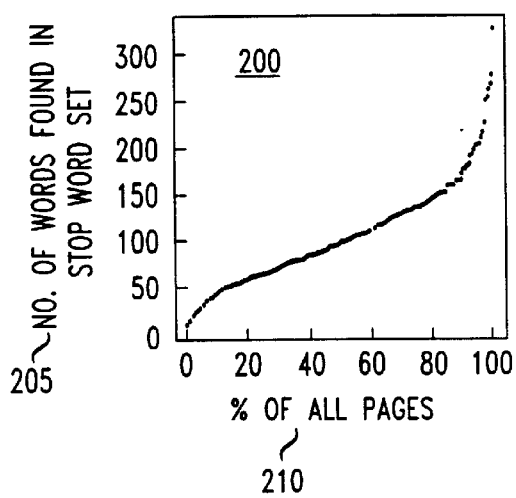
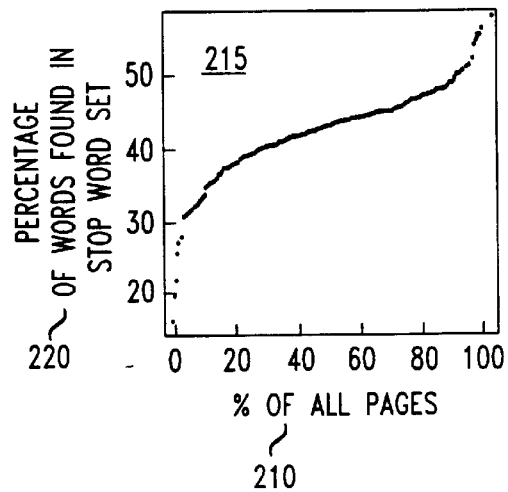

- RECOGNIZE THE STOP WORDS FROM THE IMAGE ⟵ 310
- ALIGN RECOGNIZED WORDS FOR EXTRACTION OF CHARACTER PROTOTYPES ⟵ 320
- RECURSIVELY SEGMENT RECOGNIZED WORDS ⟵ 330
- TRAIN CLASSIFIER USING CHARACTER PROTOTYPES ⟵ 340
- APPLY CLASSIFIER TO IMAGE FOR CHARACTER RECOGNITION ⟵ 350

SYNTHETIC SAMPLES OF STOP WORDS

EXAMPLES OF RECOGNIZED WORD IMAGES $_{600}\{$ have $^{615}$   $^{625}$ many $\}_{610}$
$\{$ and $\}$   $\{$ when $\}$
$620$   $630$

TWO PAIRS OF WORDS ALIGNED FOR EXTRACTION OF COMMON CHARACTERS

700

710 { a a a a a a a a a a a a a a a a
a a a a a a a a a d d d d d d d
d d d d d d d d f f f f f f f f
f f f f f f f h h h h mmn n n
n n n h o o o o o o o o o o o o
o o o o o o o o o o o o o o o o
o o o o o o o o o o o o o o o o
720 { s s s s s s s s s s s s s s s s
t t t t t t u u u u u u u u www
wwwy y y y y y

CHARACTER PROTOTYPES EXTRACTED FROM IMAGE

METHOD AND APPARATUS FOR CHARACTER RECOGNITION USING STOP WORDS

FIELD OF THE INVENTION

The present invention relates to document image processing, and more particularly, to recognizing and enhancing the images from an image source, for example, a printed document.

BACKGROUND OF THE INVENTION

A fundamental problem in the art of automatic document image processing relates to image defects, that is, imperfections in the image as compared to the original ideal artwork used to create the image. The sources of image defects are numerous and well-known. For example, the original printed document (e.g., paper document) which was the source of the image may be defective (e.g., the paper has spots of dirt, folds, or was printed from a faulty printing device.) Further, when the paper document was scanned, the paper may have been skewed while being placed in the scanner, resulting in a distortion of the image. In addition, the optics of the scanning process itself can produce defects due to, for example, vibration, pixel sensor sensitivity or noise.

The above-mentioned image defects result in poor display quality of the image and are a particular problem in document image processing because of the character recognition accuracy required in the automatic processing of documents. For example, optical character recognition ("OCR") is often an integral part of an image processing system. OCR is the process of transforming a graphical bit image of a page of textual information into a text file which can be later edited, for example, using word processing software. As is well-known in the art, image classifiers are key components of most OCR systems used for analyzing a digital representation of an image. The accuracy of such classifiers significantly decreases when the quality of the image source is degraded even slightly.

Training classifiers to recognize images having a wide range of shape variations and/or image degradations is a well-known challenge in OCR. One technique, the so-called adaptive OCR strategy, trains the classifier only for the fonts and degradation conditions which are present in a given image, e.g., a printed text page. Thus, this adaptive OCR strategy requires some knowledge of the dominant font and defects in the given image. Some previously known adaptive OCR techniques represent such knowledge implicitly through character prototypes extracted directly form the image. For example, G. Nagy et al., "Automatic Prototype Extraction for Adaptive OCR", *Proceedings of the Fourth International Conference on Document Analysis and Recognition*, Ulm, Germany, Aug. 18–20, 1997, pp. 278–282 (hereinafter "Nagy"), and A. L. Spitz, "An OCR Based on Character Shape Codes and Lexical Information", *Proceedings of the 3rd International Conference of Document Analysis and Recognition,* Montreal, Canada, Aug. 14–18, 1995, pp. 723–728, describe two such character prototyping techniques. Nagy's character prototype technique employs truth labels, or the so-called "ground truth", as input which are derived from a small segment of the actual image to be recognized. The ground truth selected from the image, e.g., text, in accordance with Nagy's technique is actually keyed in to the system by a user. Using the ground truth, a matching occurs between pairs of words from the image and the ground truth to determine matching characters and to estimate the position of each character within each word (see, e.g., Nagy, supra., p. 278.)

While the above-described adaptive OCR techniques are useful in character recognition, the reliance on ground truth and the derivation of such ground truth directly from the image to be recognized does present certain disadvantages. In particular, prior to any classification of the image, the ground truth must be selected, processed and inputted into the OCR system for each image to be recognized. Thus, certain preprocessing overhead is inherently associated with these types of ground truth based adaptive OCR techniques.

Therefore, a need exists for a adaptive OCR technique for character recognition without reliance on ground truth derived from the image itself and provided as input to the OCR system prior to classification and recognition.

SUMMARY OF THE INVENTION

The present invention provides an adaptive OCR technique for character classification and recognition without the input and use of ground truth derived from the image itself In accordance with the invention, a set of so-called stop words are employed for classifying symbols, e.g., characters, from any image. The stop words are identified independent of any particular image and are used for classification purposes across any set of images of the same language, e.g., English. Advantageously, in accordance with the invention, an adaptive OCR method is realized without the requirement of the selection and inputting of ground truth from each individual image to be recognized.

More particularly, in accordance with the preferred embodiment of the invention, adaptive image recognition is initiated by comparing the image, e.g., a text page image, to the set of stop words to determine a matching and the identification of a set of recognized words. In accordance with the preferred embodiment of the invention, the classification between the stop words and the image is facilitated by a stop word classifier constructed as a function of a decision forest. The set of recognized words are then aligned for the extraction of character prototypes. In accordance with the preferred embodiment, the extraction of character prototypes comprises four steps: (1) character width estimation; (2) word shifting; (3) common character extraction; and (4) bitmap averaging. After obtaining the character prototypes from the extraction operations of the preferred embodiment of the invention, a recursive segmentation operation is applied to completely segment the recognized words. The character prototypes obtained as a function of the stop words are then used to train a classifier for use by an OCR system for recognizing the subject image.

BRIEF DESCRIPTION OF THE DRAWINGS

FIG. 1 is a listing of an illustrative set of stop words useful in accordance with the principles of the invention for implementing an adaptive OCR system;

FIG. 2 shows a distribution of occurrences of the set of stop words of FIG. 1 in a collection of text samples;

DETAILED DESCRIPTION

Figures 3, 4, 5:
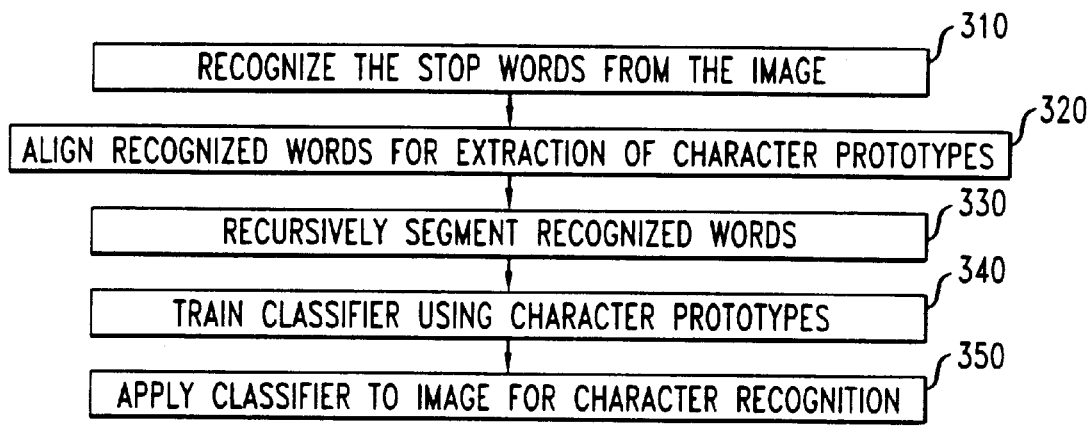
FIG. 3 is a flowchart of illustrative operations for implementing the adaptive OCR aspects of the present invention.
FIG. 4 shows an illustrative set of synthetic word samples generated in accordance with the principles of the invention.
FIG. 5 shows an illustrative set of recognized word images after applying a stop word classifier in accordance with the invention.

The present invention provides an adaptive OCR technique for character classification and recognition without the input and use of ground truth derived from the image itself In accordance with the invention, a set of so-called stop words are employed for classifying symbols, e.g., characters, from any image. The stop words are identified independent of any particular image and are used for classification purposes across any set of images of the same language. Advantageously, in accordance with the invention, an adaptive OCR method is realized without the requirement of the selection and inputting of ground truth from each individual image to be recognized.

More particularly, a set of stop words are used to facilitate the training of a classifier in accordance with the principles of the invention. A "stop word" is a common word which is known to occur frequently in passages of text, e.g., a textbook written in the English language. In the field of linguistics, there are extensive analyses on the distribution of English words which have been derived from, inter alia, large corpora, such as letter, n-gram (i.e., a tuple of "n" letters), or word frequencies. See, for example, F. Jelinek, Statistical Methods for Speech Recognition, MIT Press, 1997, which describes statistical language models. Heretofore, these linguistic statistical models have not typically been applied or used in OCR mainly due to the disparate sample sizes between linguistic models and OCR models. That is, statistics derived from large corpora such as letter, n-gram, or word frequencies, can deviate largely from those observed in small samples, such as the relatively short text (typically one page or a few pages) processed by OCR systems. Consequently, the application of probabilistic language models developed in the linguistic field to the short text in OCR is problematic.

However, I have realized that for the typically short passages in the OCR context, a set of stop words can be effectively utilized to improve the training of a classifier for recognition of characters in an image. More particularly, in accordance with the preferred embodiment of the invention discussed in more detail below, I compiled a set of 135 stop words useful in accordance with the principles of the invention herein. A complete listing of the set of stop words 100 (alternatively referred to herein as the "stop word set 100") is shown in FIG. 1. In compiling this 135 stop word set 100, I used the well-known "Brown Corpus", see, H. Kucera et al., *"Computational Analysis of Present-Day American English"*, Brown University Press, Providence, R.I., 1967. As will be appreciated by one skilled in the art, the Brown Corpus is a well-known collection of articles from the printed press, e.g., newspaper articles. Thus, this reference serves as an excellent vehicle for identifying a stop word list useful in the context of the invention. Further, I tested, in an OCR context, a reported linguistic observation (see, e.g., G. Hart, "To Decode Short Cryptograms", *Communications of the ACM,* 37, 9, Sep. 1994, pp. 102–108) which states that if one makes a list of the top 135 most common words from modern American English usage, and then selects any random word from a particular American English sentence, there is a greater than 50% chance that this random word will be contained in the most common word list.

Thus, after identifying my stop word set 100 from the Brown Corpus, I compared stop word set 100 with a collection of text samples that are of a length typically processed by OCR to test the above-described linguistic hypothesis. In particular, I employed a well-known source of images useful in OCR system modeling, namely, the so-called "Business Letter Sample Database" available from the University of Nevada Las Vegas database and described in more detail in, e.g., S. V. Rice et al., "The Fifth Annual Test of OCR Accuracy", Technical Report 96-01, Information Sciences Research Institute, University of Nevada, Las Vegas, April, 1996. The Business Letter Sample Database (hereinafter alternatively referred to as "the Sample") is a test set of 200 pages of images which have frequently been used in the OCR arts for other analyses (see, S. V. Rice et al., supra.) Basically, the illustrative stop word set 100 I compiled was compared to the Business Letter Sample Database and the number of matches were counted.

More particularly, FIG. 2 shows per page count graphical results 200 and fraction of words graphical results 215 generated from this comparison. Per page count results 200 show the number of words found in stop word set 205 vs. the percentage of all pages 210. Alternatively, fraction of words results 215 show the percentage of words found in stop word set 220 vs. the percentage of all pages 210. As one can ascertain from these results, the above-described linguistic hypothesis holds true in the OCR context. That is, for each page in the Sample, approximately 40% to 50% of the words in the Sample were found to match the stop word set. Therefore, in accordance with my invention, I have realized that the application of a set of stop words can be used effectively in an adaptive OCR technique as further detailed below.

FIG. 3 is a flowchart of illustrative operations for implementing the adaptive OCR aspects of the present invention. More particularly, in accordance with the invention, a set of stop words is specified for application to a particular input image to be recognized. In accordance with the preferred embodiment of the invention, stop word set 100 identified in FIG. 1 is used for this purpose. As a function of stop word set 100, the identification of so-called "recognized words" is made (block 310) from the input image. That is, a comparison is made between stop word set 100 and the input image to determine if any words match. The words found to match are identified as recognized words (alternatively referred to herein as "matching" words.)

In accordance with the preferred embodiment of the invention, the recognition of stop words is determined using a so-called "holistic" word recognition technique wherein each word of the image is treated as a single symbol, and recognition of words is accomplished by matching the whole shape of the word image to predefined prototypes. In accordance with the preferred embodiment of the invention, four commonly used fonts are used to create the word prototypes: Times-Roman, Courier, Helvetica, and Computer Modem Roman. Initially, synthetic images, i.e., artificially created images, of the stop words are composed using the four font prototypes consistent with conventional typographic rules, e.g., character spacing and character alignment along the baseline. Using the synthetic images, i.e. synthetic words, degraded images of the synthetic words are generated pseudo-randomly using a document image defect model.

In accordance with the preferred embodiment of the invention, the document image defect model used was that of H. Baird as described in U.S. patent application Ser. No. 07/536,910, entitled "Generation and Use of Defective Images In Image Analysis", filed on Jun. 12, 1990, allowed on Aug. 18, 1998, now U.S. Pat. No. 5,796,410 which is commonly assigned to the same Assignee herein and is hereby incorporated by reference for all purposes. For example, when applied to stop word set 100 of the preferred embodiment, four hundred synthetic word samples are generated for each stop word in stop word set 100 representing four fonts, four point sizes (e.g., 8, 10, 12, and 14), and twenty-five tuples of pseudo-random defect parameters. In order to extract certain image features, each synthetic word sample is size-normalized in a conventional manner to a size of 16 rows×64 columns.

Turning our attention briefly to FIG. 4, a set of synthetic word samples 400 is shown, generated in accordance with the preferred embodiment discussed above, for three stop words, "about", "your", and "out", respectively. The synthetic word samples generated for these particular stop words are shown in subsets 410, 420, and 430 of FIG. 4. Using the generated synthetic word samples, a feature vector is constructed to further facilitate the stop word recognition aspects of the preferred embodiment.

In particular, as is well-known, a feature vector is an array of numerical values describing the shape of a character. In accordance with the preferred embodiment of the invention, a single feature vector is derived through a concatenation of four different feature vectors:

(1) a "binary subsamples vector"—This vector contains values of subsampling the normalized image. To compute the subsamples, the original image is scanned from left to right and top to bottom. During the scanning process, each 2×2 nonoverlapping region is represented as "1" in the vector if three or more pixels of the image are black, otherwise, the region is represented as "0". The scanning process is repeated for the reduced image until there is only one remaining row or column;

(2) a "pixel correlation" vector—This vector's features are conjunctions and disjunctions of neighboring pixels in various directions such that for a given pixel I (i, j) at row i and column j:

$H(i, j)=I(i, j) \land I(i, j+2)$ horizontal neighbor $V(i, j)=I(i, j) \land I(i+2, j)$ vertical neighbor $N(i, j)=I(i, j) \land I(i+2, j+2)$ NW-SE diagonal neighbor $S(i, j)=I(i, j) \land I(i+2, j-2)$ SW-NE diagonal neighbor and $H'(i, j)=H(i, j) \lor H(i+1, j) \lor H(i+2, j) \lor H(i+3, j)$ $V'(i, j)=V(i, j) \lor V(i, j+1) \lor V(i, j+2) \lor V(i, j+3)$ $N'(i, j)=N(i, j) \lor N(i+1, j-1) \lor N(i+2, j-2) \lor N(i+3, j-3)$ $S'(i, j)=S(i, j) \lor S(i+1, j+1) \lor S(i+2, j+2) \lor S(i+3, j+3)$, where $\land$ is the binary AND, and $\lor$ is the binary OR operation. The feature vector is a concatenation of the well defined values of H'(i, j), V'(i,j), N'(i, j) and S'(i, j) for each (i, j). Illustratively, for an image of 16×16 pixels this feature vector has 268 binary components. The pixel correlation feature vector is further described in T. K. Ho et al., "Random Decision Forests", *In Proceedings of the 3rd International Conference on Document Analysis and Recognition,* Montreal, Canada, Aug. 14–18, 1995, pp. 278–282;

(3) a "vertical runs count" vector—This vector contains a count of so-called "black runs" (i.e., a contiguous block of black pixels in the image) in each column of the normalized image; and (4) a "horizontal runs count" vector—This vector contains black runs in each row of the normalized image.

In accordance with the preferred embodiment, the feature vector describing the synthetic images is used to construct a classifier as a function of a so-called decision forest. In accordance with the preferred embodiment of the invention, the decision forest classifier is constructed in accordance with the technique described in my co-pending U.S. patent application Ser. No. 08/678,937, entitled "Classification Technique Using Random Decision Forests", filed on Jul. 12, 1996, which is commonly assigned to the same Assignee herein, and is hereby incorporated by reference for all purposes. A decision forest classifier is used herein due to its accuracy, speed, and natural confidence measure which can be effectively thresholded to identify reliable decisions. Further, in accordance with the preferred embodiment, to enhance the resolution of the confidence measure, additional word samples are created using three additional fonts: ITC Bookman Medium Roman, Computer Modem Sans Serif, and Computer Modern Typewriter. Word samples using these additional fonts are then used to populate the decision forest of the classifier.

Having constructed the stop word classifier as detailed above, my technique applies this classifier to the input image for recognition of the words in stop word set 100 within the image. In accordance with the preferred embodiment, prior to applying the stop word classifier to the input image, the input image is processed through page layout analysis for extraction of text lines and location of words. Page layout analysis and character segmentation techniques are well-known, see, e.g., H. S. Baird, "Anatomy of A Versatile Page Reader", *Proceedings of the IEEE-Special Issue on OCR,* 80(7):1059–1065, July, 1992, and D. J. Ittner et al., "Language-free Layout Analysis", *Proceedings of the Second International Conference of Document Analysis and Recognition,* 1996, pp. 336–440. Thus, after performing page layout analysis to the input image, the stop word classifier is applied to each word of the input image in accordance with preferred embodiment of the invention.

Turning our attention to FIG. 5, an illustrative set of recognized word images 500 for the stop word "out" (see, FIG. 1, stop word set 100) is shown after applying the stop word classifier of the preferred embodiment. The illustrative set of recognized word images 500 was extracted from a trial I conducted wherein the stop word classifier of the preferred embodiment was applied to all 200 pages of the above-described Business Letter Sample. More particularly, for each image in the Sample, I counted the number of word images that are recognized reliably, i.e., those for which the recognition decision satisfy a confidence threshold. The confidence threshold used in this trial was 0.75. In short the results of the trial are summarized as follows:

(a) Among the 200 images of the Sample, 9469 reliably recognized word images were found. This translates to a correct recognition rate of 99.86%;

(b) 47.6 reliably recognized word images per page were found. These images represented, on the average, 20.7 distinct words per page; and (c) 13 incorrectly recognized stop words were identified by the classifier. For example, in FIG. 5, the word "cut" 510 is incorrectly recognized within the set of recognized word images 500 as "out".

Turning our attention back to the illustrative operations of FIG. 3, having identified the recognized words in accordance with the preferred embodiment, as described above, the recognized words are aligned for extraction of common character prototypes (block 320.) Prototype extraction procedures are well-known, see, e.g., Nagy, supra., and are used for the extraction of particular character prototypes from an image. In accordance with the preferred embodiment, the extraction of character prototypes from the set of recognized words consists of four steps: (1) character width estimation; (2) word shifting and matching; (3) common character extraction; and (4) bitmap averaging. More particularly, the widths of recognized word images and the characters in the decided word classes are employed to estimate the mean width of each included character, i.e., characters appearing in the decided word. This is accomplished by forming a system of linear equations, where the variables are the widths of each character that occurs in the decided words, and one variable for the inter-character space that is defined to be the same between all pairs of neighboring characters. The definition of such linear equations is described in more detail, e.g., in G. E. Kopec, "Least-Squares Font Metric Estimation From Images", *IEEE Transactions on Image Processing,* October, 1993, pp. 510–519. As will be appreciated, the character width estimations will greatly assist in the character segmentation and extraction (especially for proportional fonts) as further described below.

In accordance with the preferred embodiment, pairs of recognized words are selected based upon the property that they share one and only one common character. Employing the estimations of the character widths and inter-character spacing as described above, regions of words (from all of the recognized words) that are expected to contain a particular character are identified. For each recognized word pair, the two regions expected to contain the particular character are then shifted and matched column by column. For any two columns (one from each word), the fraction of pixels that are "black" in both columns over the total number of black pixels is used as a similarity score, i.e., a measure of the similarity of the two columns from the word pairs. The columns are aligned by the estimated baseline of both words, i.e., the words from each column, and a local search is performed to determine the optimum vertical shift. The column-wise scores are summed over the width of the region which is dependent upon the estimated character width. The horizontal shift that produces the minimum of such sums is used to align the two words. Thereafter, the region over which the column-wise score exceeds a threshold, e.g., 0.80, is extracted as the character prototype.

Figures 6, 7, 8:
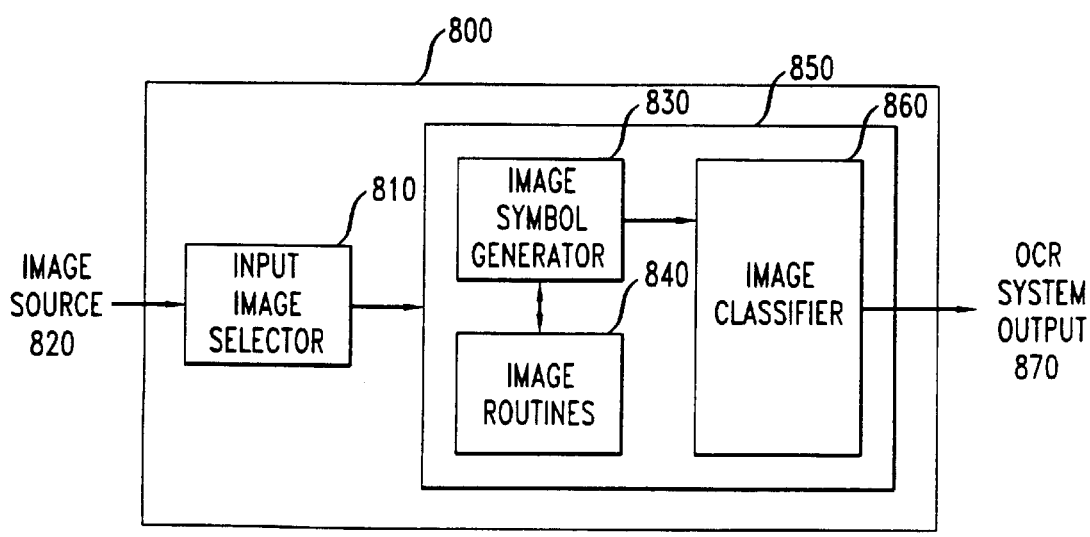
FIG. 6 shows two illustrative word pairs which are aligned for extraction of common characters in accordance with invention.
FIG. 7 shows a set of character prototypes which were extracted, in accordance with the invention, from a randomly selected input page.
FIG. 8 shows an OCR system configured in accordance with the principles of the invention.

To further facilitate an understanding of the above-described extraction of character prototypes of the preferred embodiment, FIG. 6 shows two illustrative pairs of words, 600 and 610, respectively, which are aligned for extraction of common characters as described above. In particular, word pair 600 has the character "a," aligned in positions 615 and 620 indicating the extraction of that character. Similarly, word pair 610 has the character "n" aligned in positions 625 and 630 indicating the extraction of that character as well. As will be appreciated, in many instances more than one character prototype may be extracted for the same letter from a single input image. For example, FIG. 7 shows a set of character prototypes 700 which were extracted, in accordance with the preferred embodiment of the invention, from a randomly selected page selected from the Sample in my trial as described above. As shown, every letter in character prototype set 700 has more than one associated prototype. For example, as seen in FIG. 7, the character prototype for the character "a" has a series of twenty eight character prototypes 710, and the character "s" has a series of eighteen character prototypes 720. The consolidation of such multiple character prototypes into a single character prototype is accomplished in a variety of well-known manners. For example, so-called bitmap averaging can be used to align the centroids of related character prototypes and a majority vote is taken to consolidate and identify the single character prototype from the set. Alternatively, a more sophisticated bitmap averaging technique may be used wherein alignment is performed to sub-pixel accuracy as described in my co-authored paper, J. Hobby and T. K. Ho, "Enhancing Degraded Document Images via Bitmap Clustering and Averaging", *Proceeding of the $4^{th}$ International Conference on Document Analysis and Recognition, Ulm, Germany,* Aug. 18–20, 1997, pp. 394–400.

Turning our attention back to the illustrative operations of FIG. 3, having obtained the character prototypes in the extraction operations of the preferred embodiment of the invention, a recursive segmentation operation (block 330) is applied to completely segment the recognized words. In accordance with the preferred embodiment, word images are first segmented at the position where a character has been extracted (as described above), and the decided word is divided accordingly. Thereafter, characters obtained from other word pairs are shifted on top of the partial word images for further matching and segmentation. This process continues until such time that there are no more character prototypes available for matching to the remaining partial images.

The above-described segmentation process produces an improved set of character prototypes which are used to train a classifier (see, FIG. 3, block 340) for character recognition within an image by an OCR system. Thus, in accordance with the preferred embodiment of the invention, the trained classifier is applied to the image for symbol recognition (block 350.) Of course, the character prototypes identified in accordance with the invention can be used for a variety of recognition related purposes. For example, further embodiments of the invention include adapting a classifier in an "on-the-fly" manner using the prototypes or using the character prototypes to determine matches to a font database in order to estimate the dominant font on a given page of text. Further embodiments, include using the character prototypes to synthesize word shapes for a larger lexicon for the recognition of the remaining words.

As described above, the advantages of the present invention are of particular import in image processing applications such as OCR. FIG. 8 shows an illustrative OCR system in which the advantages of the invention can be realized. In particular, OCR system 800 has an input image selector 810 which is used to select an input set of images, illustratively a set of printed characters, from image source 820. Illustratively, image symbol generator 830 and image routines 840, both shown illustratively as part of OCR engine 850, work in conjunction to perform the illustrative operations of the invention as detailed above. Advantageously, an improved set of images is provided to image classifier 860. Image classifier 860, illustratively shown as part of OCR engine 850, is used to classify images from the original image source. The classifications made by image classifier 860 are then used by OCR engine 850 which applies well-known image recognition principles to image source 820 to produce well-known OCR system output 870.

The foregoing merely illustrates the principles of the present invention. Those skilled in the art will be able to devise numerous arrangements which, although not explicitly shown or described herein, embody those principles and are within their spirit and scope.

I claim:

1. A method for training an image classifier, the method comprising:

identifying a plurality of stop words, each stop word being from a same language and having an associated definition in such language, the plurality of stop words being identified as a function of a linguistic model and the plurality of stop words having an expected recognition coverage level associated therewith, wherein the plurality of stop words is limited to the following stop words: a, about, after, all, also, an, and, any, are, as, at, back, be, because, been, before, being, between, both, but, by, can, could, day, did, do, down, each, even, first, for, from, get, good, had, has, have, he, her, here, him, his, how, I, if, in, into, is, it, its, just, know, life, like, little, long, made, make, man, many, may, me, men, more, most, Mr., much, must, my, never, new, no, not, now, of, old, on, one, only, or, other, our, out, over, own, people, said, same, see, she, should, so, some, state, still, such, than, that, the, their, them, then, there, these, they, this, those, three, through, time, to, too, two, under, up, very, was, way, we, well, were, what, when, where, which, who, will, with, work, world, would, year, years, you, and your;

comparing the plurality of stop words to a plurality of individual words in an input image, each stop word and each individual word being treated as a separate symbol during the comparing;

identifying matches between particular ones of the stop words and particular ones of the individual words of the input image, wherein each particular stop word matches a same particular individual word throughout the input image, to form a plurality of recognized words;

segmenting the plurality of recognized words to form a plurality of character prototypes; and training the image classifier using the plurality of character prototypes to recognize at least one character from the input image.

2. The method of claim 1 wherein the identifying matches operation includes:

constructing a stop word classifier using a decision forest; and applying the stop word classifier to the input image.

3. The method of claim 2 wherein the segmenting the plurality of recognized words operation includes:

aligning particular ones of the recognized words; and extracting a plurality of common character prototypes as a function of the aligning between the particular ones of the recognized words.

4. The method of claim 3 wherein the extracting the plurality of common character prototypes operation further comprises:

estimating a width for each character of the particular ones of the recognized words; and shifting and matching at least one pair of recognized words using the estimated width for each character of the particular ones of the recognized words of the pair.

5. The method of claim 3 wherein the input image is a printed document.

6. The method of claim 5 wherein the image classifier is part of an optical character recognition system.

7. The method of claim 2 wherein the constructing the stop word classifier operation further comprises:

generating a plurality of synthetic words corresponding to a particular stop word; and identifying a feature vector for the particular stop word as a function of the corresponding plurality of synthetic words, and using the feature vector to construct the stop word classifier.

8. The method of claim 7 wherein the feature vector is a combination of a binary subsamples vector, a pixel correlation vector, a vertical runs count vector, and a horizontal runs count vector.

9. An optical character recognition apparatus comprising:

a selector for selecting at least one input image from an image source, the input image having a plurality of individual words;

an image symbol generator for comparing a plurality of stop words to the input image, each stop word being from a same language and having an associated definition in such language, the plurality of stop words being identified as a function of a linguistic model and the plurality of stop words having an expected recognition coverage level associated therewith, identifying matches between particular ones of the stop words and particular ones of the individual words of the input image, wherein each particular stop word matches a same particular individual word throughout the input image, to form a plurality of matching words, segmenting the plurality of matching words to form a plurality of character prototypes, wherein the plurality of stop words is limited to the following stop words: a, about, after, all, also, an, and, any, are, as, at, back, be, because, been, before, being, between, both, but, by, can, could, day, did, do, down, each, even, first, for, from, get, good, had, has, have, he, her, here, him, his, how, I, if, in, into, is, it, its, just, know, life, like, little, long, made, make, man, many, may, me, men, more, most, Mr., much, must, my, never, new, no, not, now, of, old, on, one, only, or, other, our, out, over, own, people, said, same, see, she, should, so, some, state, still, such, than, that, the, their, them, then, there, these, they, this, those, three, through, time, to, too, two, under, up, very, was, way, we, well, were, what, when, where, which, who, will, with, work, world, would, year, years, you, and your;

an image classifier for classifying at least one character from the input image using the plurality of character prototypes; and an image recognizer for producing at least one recognized image from the image source using the at least one character.

* * * * *